April 9, 1968     W. HANSLIK     3,376,604
MULTI-SCREW EXTRUDERS
Filed Jan. 14, 1966     2 Sheets-Sheet 1
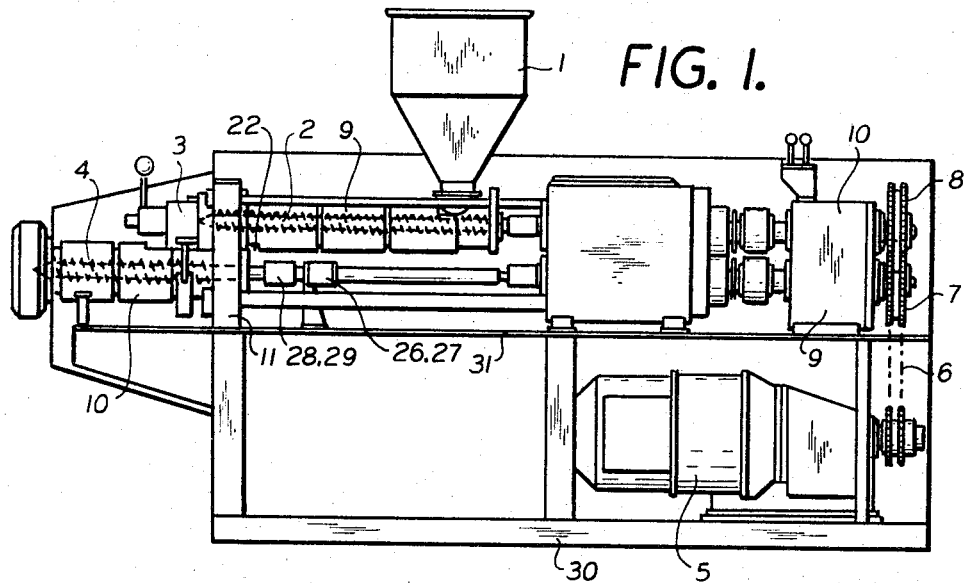
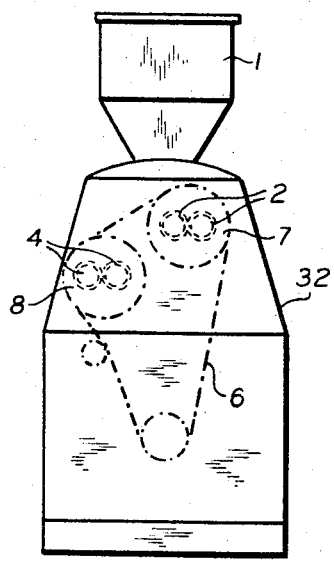
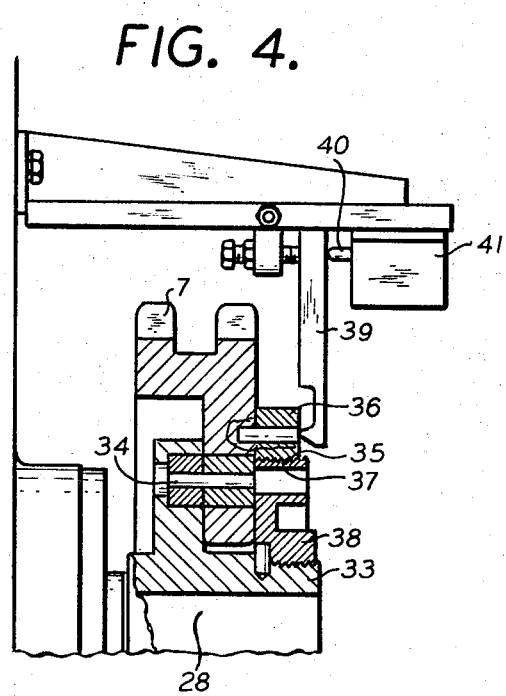
INVENTOR.
WILHELM HANSLIK
BY
ATTORNEY.

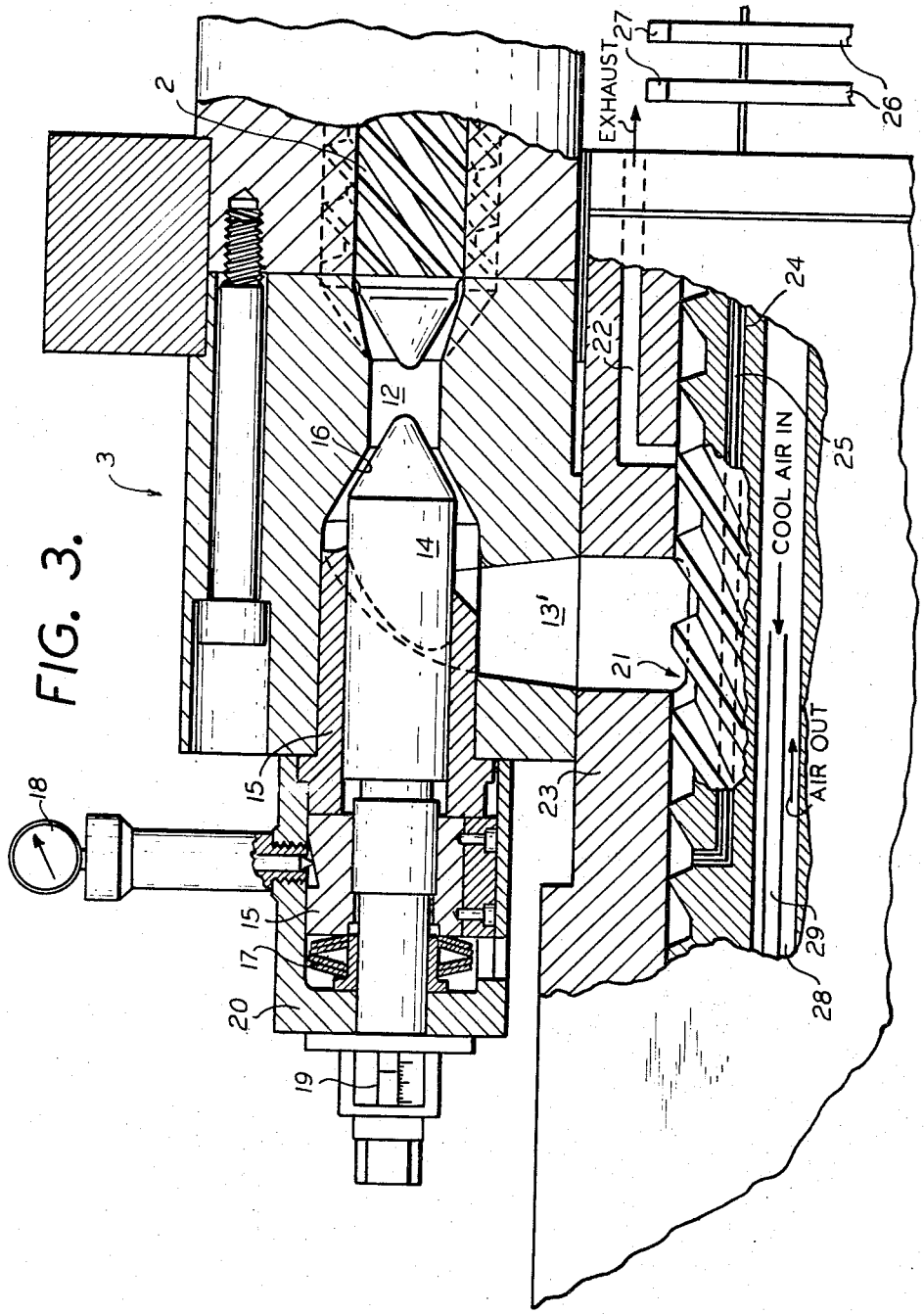

3,376,604
MULTI-SCREW EXTRUDERS
Wilhelm Hanslik, Vienna, Austria, assignor to
Wilhelm Anger OHG, Vienna, Austria
Filed Jan. 14, 1966, Ser. No. 520,589
5 Claims. (Cl. 18—12)

ABSTRACT OF THE DISCLOSURE

A multi-screw extruder has an upper and a lower screw conveyor. The upper conveyor serves to pre-plasticize the material before passing it on towards the lower conveyor for plasticizing an extrusion. An adjustable throttle is arranged in the path of the material between the two conveyors.

---

This invention relates to multi-screw extruders and more specifically to an extruder using several pairs, one pair serving substantially for plastification and the other serving substantially for pushing.

One of the objects of the invention is to reduce the length of the screws while increasing output and quality, and at the same time further to reduce cost by using as input material so-called dry blend i.e. an unpelletized or unprepared powder mixture, and more specifically, powder mixtures varying within wide limits.

A further object of the invention is to provide in the connection between one pair of extruder screws and the next following pair of extruder screws a pressure free space which permits degassing or evacuation of the plasticized material. Another object of the invention is to regulate the passage of the material from one pair of screws onto another in such a way that once a predetermined regulation is applied for a particular dry blend and a specific product, any further adjustment will occur substantially automatically.

Still another object of the invention is to prevent continuous operation of one screw pair in case operation of another succeeding or preceding screw pair is interrupted.

These and any other objects of the invention will be more fully shown and described by way of drawings annexed herein in which FIG. 1 represents in elevation an assembly of a 4-screw extruder embodying certain principles of the invention in cross-section.

FIG. 2 represents a corresponding end elevational view.
FIG. 3 represents in greater detail and in cross section a portion of FIG. 1 and FIG. 4 also enlarged another portion of FIG. 1.

As apparent from FIGS. 1 and 2 the raw material or dry blend powder will be fed over hopper 1 into the top pair of plasticizing screws 2, and the resulting more or less plastified material is pressed through a reduction unit schematically indicated at 3 and shown in greater detail in FIG. 3 into a lower pair of screws 4 serving more or less as pushing elements. Plasticizing screws 2 which also serve as drawing screws have deep windings but relatively small pitches. This means that a portion of the heat contributed from the outside is increased with respect to the friction heat. By decreasing the friction heat, the necessary driving moment is reduced. Since the heat contributed from the outside is easily adjustable, it is also possible to increase the setting time of the material.

Pushing screws 4 have windings which are relatively low in height but provided with relatively large pitch. This construction has the following advantages: Homogeneous furthering of the material and a relatively short setting time. There is no overheating, which is important for the working of hard polyvinyl chloride. Pushing screws 4 can be made hollow so as to apply air cooling to their inside and to prevent the material from baking on.

Screw pairs 2, 4 are driven from a common motor 5. Motor 5 is regulated by brush adjustment and drives through a chain 6, two chain wheels 7, 8 and two reduction gears 9, 10, the distribution gears (not shown) coupled to the shafts of the two screw pairs 2, 4.

Chain wheels 7, 8 can be exchanged. In this manner, it is possible to achieve different rotary speeds, predeterminedly proportioned to each other, for plasticizer and the pushing screws 2, 4. Only in this manner it is possible to work materials of different friability and of widely varying powder densities.

Since the screw drives following the driving motor 5 are divided and separated, it is also possible to divide the driving torques into about two halves, depending upon the size of the exchangeable chain wheels. This increases the edge life of the distribution gears considerably.

The two screws of each pair 2, 4 are driven in opposite directions, and each pair is arranged in cylinders 9, 10 which, surrounded by resistance heaters, (not shown), are rigidly clamped on one side onto a pressure plate 11; on the other side they are mounted movably. In this way, extensions due to heat are compensated.

Further in accordance with the invention, reduction unit 3 serves to regulate the passage of the material passing between the two pairs of screws 2, 4.

As illustrated in greater detail in FIG. 3, the material is pressed by the plasticizing screws 2 into a collection channel 12 of inlet piece 13 of reduction unit 3. Transition into deflection space 13 of pushing screws 4 takes place along a cone 14 which is guided in a wedge shaped sleeve 15. Cone 14 can be adjusted in longitudinal direction with the aid of nut 15 against cup springs 17. In this way the gap 16 between cone 14 and inlet piece 13 can be made larger or smaller. This gap adjustment permits the back pressure to be accurately regulated and therefore plastification to be affected directly. The back pressure can be adjusted during operation, and within the unit. It is therefore not dependent on the back pressure of the injection tool, which is not adjustable. This is important for example in the working of polyvinyl chloride where the fused mass leaving the unit becomes very sensitive and throttling leads to eliminations and burnings.

The factors affecting the back pressure consist mainly of output quantity, viscosity and friction coefficient. The deformation or extension taken by cup springs 17 is indicated on a measuring device 18. This also transmits the prevailing pressure to cone 14. The width of gap 16 is indicated on scale 19. The entire regulation device is attached to inlet piece 13 by means of a flange 20. The plastic mass pushed over cone 14 will be transferred through channel 13 into the pushing screw space schematically indicated at 21.

This arrangement has the following features:
(1) Control of the back pressure within the plastification machine whereby the plastification output of the screw is affected directly. It is important that the adjustment is effected within the unit since, for example, for PVC where the fused mass after leaving the screws becomes very sensitive any throttling may lead to eliminations and burnings.
(2) Measuring of the back pressure.
(3) Automatic regulation of the back pressure.
(4) Readout of the adjustment of the gap.
(5) Safe deflection without dead angles of the screw in the pushing section of the extruder.

The entire adjustment device is attached to the inlet piece by means of a flange 20 and therefore if necessary readily accessible.

A particular feature of the multi-screw extruder, and especially the four screw-extruder in accordance with the invention, is to provide degasification within the pushing screws. This degassing takes place not as usual in radial but in accordance with the invention, in axial direction by an exhaust line 22 in cylinder portion 23 of the pushing screws. In this way, the undesired rise of the material through the usual degassing openings, is excluded and complete decompression achieved.

The inner temperature of the pusher screws is taken off through bore holes 24 by means of thermocouples 25 connected over slide rings 26 and through brushes 27, to temperature measuring instrument (not shown).

Inner cooling of the pushing screws is provided through bore holes 28 and inner tube 29 which serves as intake for compressed air which is guided to the outside by the space between tube 28 and hole 29.

The supporting frame 30 of the machine is realized in the form of a welded construction and it serves at the same time to receive the driving motor 5, the oil pump aggregate (not shown), the degassing pump (not shown), as well as the connection terminals (not shown) for the electric equipment.

On frame 30 also, there is arranged a plate 31 carrying the reduction and the distribution gears as well as the pressure plate 11 for the cylinder support.

The entire machine is covered with a functionally decorative cover of sheet metal.

Generally the reduction unit shown in FIG. 3 serves to adjust the back pressure in one extruder screw unit, as stated above, and at the same time it serves to cause the transfer of the material to a secondary screw unit which may also contribute to the plastification process, apart from serving as pusher 1.

Generally, the value of any screw extruder or screw press for the plastification and thorough mixing is determined to a very great extent by the back-pressure opposing the push of the screws to the outside. When the transit time of the plastic material to be worked on, is relatively short, the influence of the outside temperature on the cylinder is very small. By the regulation of the back pressure a mechanical regulation of the plastification output of the screw, is determined.

In order to increase safety of operation in a multi-screw extruder of the type shown and described as a further object of the invention, the two screw pairs are arranged to be operated simultaneously, yet in a manner substantially independent from each other, thus preventing in case one of the screw pairs becoming inoperative, the other screw pair from being damaged by the accumulation of plastic material.

In order to achieve this purpose, as indicated in FIG. 1, each of the two screw pairs is coupled to a chain wheel 7, 8, and each of the two chain wheels, which are driven by a common chain 6 from a common driving motor 5, is provided with a separate shear pin which is adapted to break under a predetermined excessive back pressure, and thereby separate the screw pair coupled to that particular chain wheel from the motor. In accordance with a further feature of this invention, each of the shear pins does not only decouple the chain wheel concerned from the affected screw pair, but it also interrupts an electric circuit controlling the common driving motor and therefore immediately discontinues the drive of the second chain wheel and the second screw pair. Thus with a minimum of driving elements, a maximum of operational security is assured.

More specifically, as apparent from FIG. 4 which illustrates this safety device on one of the chain wheels driving one of the screw pairs, the chain wheel is indicated at 7, and is shown to be coupled with hub 33, coupled to that screw pair, by means of a shear pin 34. As a result, in case chain wheel 7 is excessively stressed, shear pin 34 will break, and hub 33 will stop. At the same time, however wheel 7 will rotate further and engaging with thread 35 on roller 36 operate a similar thread 37 positioned on hub portion 38. The rotation of wheel 7 on pin 29 will also move roller 36 out of engagement with lever arm 39 which in turn under control of a spring contact indicated at 40 will operate switch 41 shutting off the common driving motor.

While the invention has been described and illustrated with a certain number and certain types of screws, and certain arrangements of screws and furthermore, with specific regulating and measuring elements and devices, the invention is not limited thereto but may be applied in any form or manner whatsoever, to any type of material, without departing from the scope of this disclosure.

What is claimed is:

1. In an extruder for plastic material, in combination, an upper conveyor including cooperating screws operable for propelling said material, a lower conveyor including cooperating screws operable for receiving material from said upper conveyor and propelling it to be extruded, means establishing a connecting passage between said conveyors operative for conducting said material from the upper to the lower conveyor, and adjustable throttling means disposed in said passage operable for adjustably varying the cross section of said passage and thereby regulating the quantities of said material passed to said lower conveyor.

2. In an extruder, as claimed in claim 1, and driving means operable for simultaneously driving the screws of both said conveyors.

3. In an extruder, as claimed in claim 2, said driving means including adjustable gear means settable for driving the screws of one conveyor at a selectively adjustably predetermined rotational speed ratio relative to the screws of the other conveyor.

4. In an extruder, as claimed in claim 1, said throttling means comprising a portion of said passage being tapered forming a seat, a stem movable in opposite directions towards and from said seat and having facing said seat a tapered portion, the taper of which matches that of said seat, said stem being movable manually in said directions, thereby adjusting said throttling means.

5. In an extruder, as claimed in claim 4, and resilient means in driving connection with said stem urging said stem in the direction towards said seat, thereby imparting resiliency to the adjusted position of said stem.

References Cited

UNITED STATES PATENTS

| | | | |
|---|---|---|---|
| 902,850 | 11/1908 | Auchu | 18—12 |
| 1,533,191 | 4/1925 | Kaiser et al. | 18—12 |
| 1,535,392 | 4/1925 | Ashton | 18—2 |
| 1,780,112 | 10/1930 | Bowman | 18—2 |
| 1,789,751 | 1/1931 | Hiller. | |
| 1,902,295 | 3/1933 | Shooks | 18—12 |
| 2,179,961 | 11/1939 | Schnuck | 18—2 |
| 2,449,355 | 9/1948 | Wiley et al. | 18—12 |
| 2,458,068 | 1/1949 | Fuller | 18—12 X |
| 2,524,999 | 10/1950 | Schulerud | 18—12 X |
| 2,640,033 | 5/1953 | Marshall | 18—12 X |
| 2,641,800 | 6/1953 | Meyers | 18—12 |
| 3,067,462 | 11/1962 | Kullgren | 18—12 |
| 3,121,130 | 2/1964 | Wiley et al. | 18—12 X |
| 3,150,214 | 9/1964 | Scalora et al. | 18—12 X |
| 3,261,056 | 7/1966 | Fritsch | 18—12 |
| 3,287,477 | 11/1966 | Vesslund | 18—12 |

FOREIGN PATENTS

| | | |
|---|---|---|
| 967,564 | 8/1964 | Great Britain. |
| 992,310 | 5/1965 | Great Britain. |

WILLIAM J. STEPHENSON, *Primary Examiner.*